(12) United States Patent
Azuma

(10) Patent No.: US 8,452,348 B2
(45) Date of Patent: May 28, 2013

(54) HANDS-FREE APPARATUS

(75) Inventor: Kazuyoshi Azuma, Kariya (JP)

(73) Assignee: Denso Corporation, Kariya (JP)

( * ) Notice: Subject to any disclaimer, the term of this patent is extended or adjusted under 35 U.S.C. 154(b) by 185 days.

(21) Appl. No.: 12/592,782

(22) Filed: Dec. 2, 2009

(65) Prior Publication Data

US 2010/0144401 A1    Jun. 10, 2010

(30) Foreign Application Priority Data

Dec. 4, 2008    (JP) ................................. 2008-309653

(51) Int. Cl.
   *H04M 1/00*    (2006.01)
(52) U.S. Cl. .................. 455/569.2; 455/41.2; 455/569.1
(58) Field of Classification Search ............... 455/569.2
   See application file for complete search history.

(56) References Cited

U.S. PATENT DOCUMENTS

| | | | |
|---|---|---|---|
| 6,993,367 B2 * | 1/2006 | Yamato et al. | 455/569.2 |
| 7,424,288 B2 * | 9/2008 | Jung et al. | 455/416 |
| 7,519,399 B2 | 4/2009 | Suzuki | |
| 2004/0151285 A1 | 8/2004 | Sychta | |
| 2006/0052141 A1 | 3/2006 | Suzuki | |
| 2007/0026904 A1 | 2/2007 | Matsuda | |
| 2007/0135175 A1 * | 6/2007 | Matsuda | 455/569.1 |
| 2008/0039153 A1 | 2/2008 | Katoh et al. | |
| 2008/0051156 A1 | 2/2008 | Matsuda | |
| 2008/0125186 A1 * | 5/2008 | Chen et al. | 455/569.1 |
| 2008/0261524 A1 * | 10/2008 | Grushkevich | 455/41.2 |
| 2009/0209297 A1 | 8/2009 | Suzuki | |
| 2010/0144400 A1 | 6/2010 | Azuma | |

FOREIGN PATENT DOCUMENTS

| | | |
|---|---|---|
| JP | 11-262041 | 9/1999 |
| JP | 2003-218996 | 7/2003 |
| JP | 2005-260451 | 9/2005 |
| JP | 2005-286553 | 10/2005 |
| JP | 2006-080617 | 3/2006 |
| JP | 2006-094477 | 4/2006 |
| JP | 2007-36678 | 2/2007 |
| JP | 2007-104343 | 4/2007 |
| JP | 2008-042717 | 2/2008 |
| JP | 2008-053805 | 3/2008 |
| JP | 2010-136075 | 6/2010 |

OTHER PUBLICATIONS

Office action dated Oct. 26, 2010 in corresponding Japanese Application No. 2008-309653.

* cited by examiner

*Primary Examiner* — Ajibola Akinyemi
(74) *Attorney, Agent, or Firm* — Harness, Dickey & Pierce, PLC

(57) ABSTRACT

A hands-free apparatus in a vehicle has two cellular phones connected through simultaneous HFP connections, with one of the two cellular phones having a private call and the other of the two cellular phones receiving a voice call. The hands-free apparatus displays on a touch screen a call transfer switch for switching the private call to the hands-free call regarding the call of the first cellular phone and a response switch for responding to the voice call to the second cellular phone. In this manner, both of the private call and the voice call are appropriately handled by a user without any restriction even when the voice call is received by the second cellular phone during the hands-free call of the first cellular phone.

6 Claims, 6 Drawing Sheets

HANDS-FREE APPARATUS

CROSS REFERENCE TO RELATED APPLICATION

The present application is based on and claims the benefit of priority of Japanese Patent Application No. 2008-309653, filed on Dec. 4, 2008, the disclosure of which is incorporated herein by reference.

FIELD OF THE INVENTION

The present disclosure generally relates to a hands-free apparatus for use in a vehicle. More specifically, the hands-free apparatus having a capability to establish multiple connections of a hands-free call communication protocol simultaneously to multiple cellular phones is disclosed.

BACKGROUND INFORMATION

Conventionally, as disclosed, for example, in Japanese patent document JP-A-2003-218996, the Bluetooth-enabled hands-free apparatus for use in a vehicle connects, according to a Bluetooth communication standard, a hands-free call through a Hands-Free Profile (HFP) to a Bluetooth-enabled cellular phone, when the cellular phone is brought into the vehicle and is in a Bluetooth communication enabled condition. Further, multiple connections of HFP are connected simultaneously to multiple cellular phones by the hands-free apparatus in recent years, according to the above patent document. That kind of connection is known as "multiple connections" of HFP.

When the multiple HFP connections are established from the hands-free apparatus to the multiple cellular phones, one of the multiple phones may receive an incoming voice call while another phone is involved in a hands-free call. The assignee of the present application has filed another application JP-A-2009-224984 (US 2009/0209297A1) that discloses a hands-free call switching scheme involving two cellular phones. In that disclosure, when one of the cellular phones (i.e., a subject phone) receives an incoming voice call with the other cellular phone that is having the hands-free call, the hands-free call of the other cellular phone is switched from a hands-free call condition to a hold condition before picking up the incoming voice call to the subject phone as a hands-free call.

Now, the hands-free call through the HFP may take the following two forms, that is, a hands-free call condition and a handset call condition. The hands-free call condition uses the speaker and the microphone on the hands-free apparatus for a conversation that is not private, and the handset call condition uses the speaker and the microphone on the cellular phone for a conversation that is private.

Thus, a problem arises from the call switching scheme in the above-described another application when, for example, one of the multiple cellular phones (i.e., the subject phone) receives an incoming voice call while the other cellular phone is involved in a handset call, because the above application does not disclose any method for handling the just-described situation. In this case, if the hands-free apparatus allows a user operation for picking up the incoming voice call to the subject phone, for example, with a restriction of the user operation for the handset call of the other phone, the handset call of the other phone is left un-attended. In other words, a proper handling method for attending both of the two calls through multiple HFP connections, that is, the incoming voice call to one cellular phone and the handset call to the other cellular phone has been expected.

SUMMARY OF THE INVENTION

In view of the above and other problems, the present disclosure provides a hands-free apparatus that enables a proper handling of at least two HFP-connected calls via Bluetooth-enabled cellular phones to the apparatus. In an aspect of the present disclosure, the hands-free apparatus for use in a vehicle includes: a connection unit for simultaneously establishing multiple connections to multiple cellular phones through a hands-free call protocol being connected for a hands-free call, each of the cellular phones is capable of selecting one of two call conditions, (a) one of two conditions is a hands-free call condition that enables, with a voice path connected to the hands-free apparatus, voice input by a voice input unit of the hands-free apparatus and voice output by a voice output unit of the hands-free apparatus for sending and receiving voice between the hands-free apparatus and a call partner, and (b) the other of two conditions is a handset call condition that enables, with the voice path closed to the hands-free apparatus, voice input by a voice input unit of the cellular phone and voice output by a voice output unit of the cellular phone for sending and receiving voice between the cellular phone and the call partner; a control unit for presenting two functions, among which a first function is to make a user accessible to a call transfer switch that allows switching to the hands-free call condition from the handset call condition of the cellular phone through the currently-connected hands-free call protocol being connected to the connection unit, and a second function is to make the user accessible to a response switch that establishes a hands-free call for responding to an incoming voice call to the cellular phone that has the hands-free call protocol currently being connected to the connection unit. Further, when (i) one of the multiple cellular phones having the hands-free call protocol connected to the connection unit is in the handset call condition, and (ii) an other one of the multiple cellular phones having the hands-free call protocol connected to the connection unit is receiving an incoming voice call, the control unit makes the user simultaneously accessible to the call transfer switch in association with the one of the multiple cellular phones and accessible to the response switch in association with the other one of the multiple cellular phones.

In this manner, the user can selectively determines, by using the call transfer switch, whether or not to switch the call from the handset call condition to the hands-free call condition for enabling the one of the multiple cellular phones to establish the hands-free call, and the user can also selectively determines, by using the response switch, whether or not to respond to the incoming voice call to the other one of the multiple cellular phones for establishing the call as the hands-free call. That is, in other words, the user is, by the hands-free apparatus of the present disclosure, enabled to handle both of the handset call of the one of the multiple cellular phones and the incoming voice call of the other one of the multiple cellular phone properly without any restriction.

Further, the control unit has a third function that makes the user accessible to a call reject switch that rejects an incoming voice call to the cellular phone that is connected through the hands-free call protocol to the connection unit, and, when (a) the one of the multiple cellular phones having the hands-free call protocol connected to the connection unit is in the handset call condition and (b) the other one of the multiple cellular phones having the hands-free call protocol connected to the connection unit is receiving an incoming voice call, the control unit makes the user simultaneously accessible to the call transfer switch in association with the one of the multiple cellular phones and accessible to the response switch and the call reject switch in association with the other one of the multiple cellular phones.

In this manner, besides having the first option to switch the handset call to the hands-free call and the second option to establish an incoming voice call as the hands-free call, the user also has, by using the call reject switch, the third option of whether or not to reject the incoming voice call to the other one of the multiple cellular phones.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
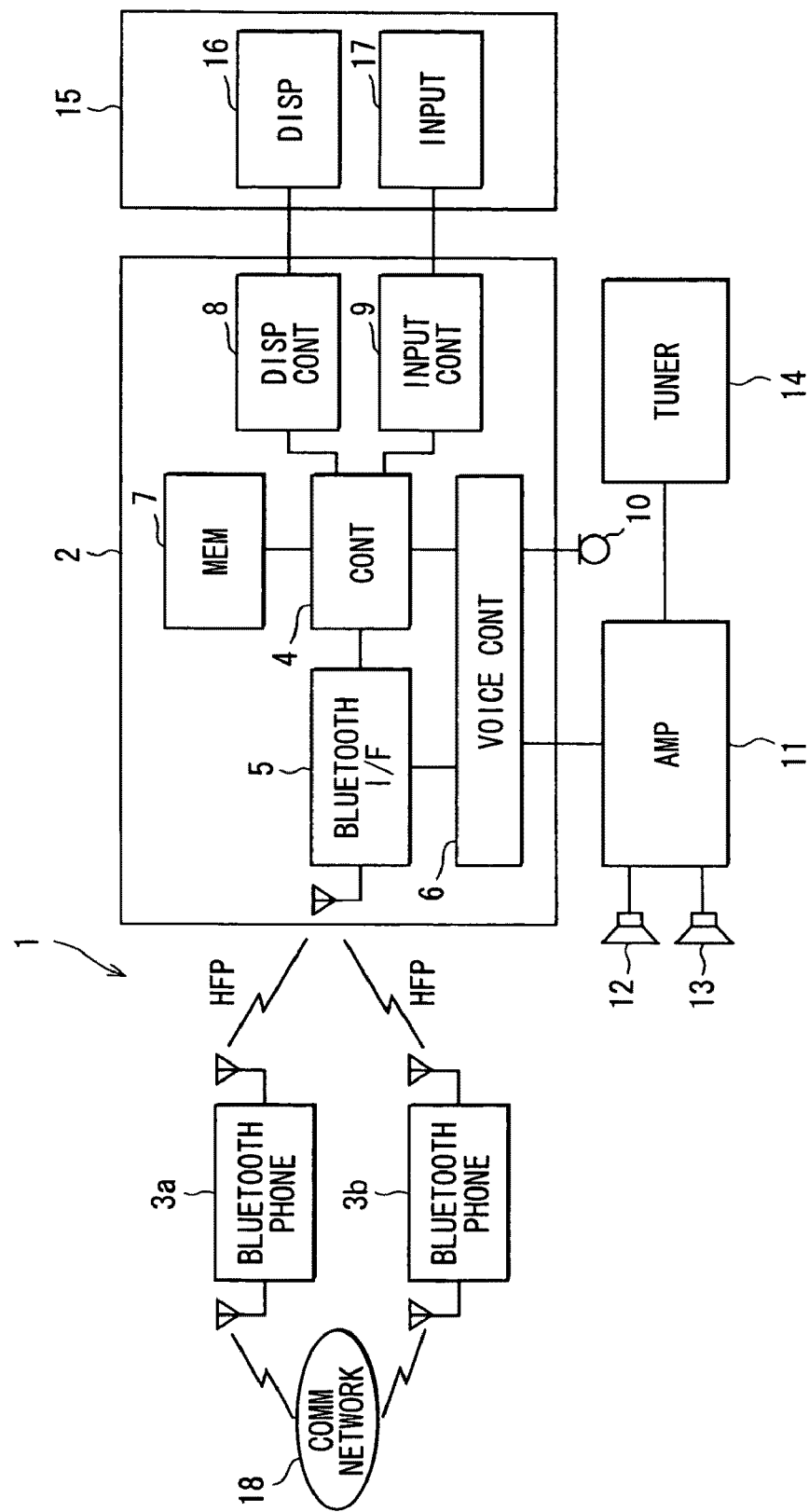
FIG. 1 is a block diagram of a hands-free system in an embodiment of the present disclosure.

The one exemplary embodiment of the present disclosure is described with reference to the drawing. In the following description, the hands-free apparatus (i.e., a hands-free apparatus also in claims) with Bluetooth communication capability is used in the vehicle, with two Bluetooth communication capable cellular phones brought into the same vehicle. The hands-free apparatus and the two cellular phones are assumed to be in the communication enabled condition through the Bluetooth protocol. In the following, Bluetooth is abbreviated as BT. Please note that Bluetooth is a registered trademark.

An in-vehicle hands-free system 1 consists of two cellular phones 3a, 3b and a hands-free apparatus 2 as shown in FIG. 1. The hands-free apparatus 2 includes a control unit 4 (i.e., a control unit also in claims), a BT interface (I/F) unit 5 (i.e., a connection unit in claims), a voice control unit 6, a memory unit 7, a display controller 8, and a touch input controller 9.

The control unit 4 has a CPU, a RAM, a ROM and an input/output (I/O) bus found in a well-known type microcomputer, and controls the operation of the hands-free apparatus 2 as a whole. The operation of the apparatus 2 includes the communication operation and the data management operation. The BT interface unit 5 has a function to perform the BT communication with the cellular phones 3a, 3b, by being compliant to the hands-free profile (HFP) defined in the Bluetooth communication standard for enabling a hands-free call (i.e., a hands-free call protocol in claims). The interface unit 5 and the two cellular phones 3a, 3b can establish so-called "multiple connections" of HFP, that is, can simultaneously connect two or more lines of connection therebetween. The interface unit 5 is, besides the HFP described above, also compliant to other profiles such as (a) a phone book access profile (PBAP) for enabling transfer of a phone book data, an outbound call history data, an inbound call history data, (b) an object push profile for enabling transfer of various data (OPP), and (c) a message access profile for enabling transfer of e-mails. These profiles are communication protocols for respective functions.

The voice control unit 6 has a connection to a microphone 10 (i.e., a voice input unit in claims) that is installed at, for example, a steering wheel proximity position for collecting user's voice, and has a connection to an amplifier 11 that is external to the hands-free apparatus 2, having a connection to two speakers 12, 13 (i.e., a voice output unit in claims). The speakers 12, 13 are symmetrically positioned relative to a front-rear axis placed along a longitudinal direction of the vehicle, to be installed in, for example, a driver's side door and a passenger's side door. Further, the amplifier 11 also has a connection to a tuner-deck 14, for having an input of music on a record medium or radio program from the deck 14 and for sending an output of amplified sound of the music/program to the speakers 12, 13.

The memory unit 7 is configured to be capable of memorizing various kinds of data, such as (a) phone book data to list telephone number to registration name relations, (b) outbound call history data to list call time to call number relations regarding call-placement operation of outbound calls from (b-1) the cellular phones 3a, 3b that are connected to the hands-free apparatus 2 through HFP and (b-2) the hands-free apparatus 2 itself, and (c) inbound call history data to list call time to call number relations regarding call-receiving operation of inbound calls to the cellular phones 3a, 3b that are connected to the hands-free apparatus 2 through HFP.

A display unit 15 includes a display screen 16 and a touch operation input unit 17. The display screen 16 is used to display various screens, and the touch operation input unit 17 forms a touch switch on the display screen 16. The display controller 8 controls the display operation of the display screen 16 of the display unit 15 based on an input of a display instruction when the display instruction is input to the control unit 4. The touch input controller 9 outputs an operation detection message to the control unit 4, when the operation detection message is input from the touch operation input unit 17 based on the user's operation of the touch switch formed on the display screen 16. The control unit 4 then analyzes the operation detection message from the touch input controller 9.

The cellular phones 3a, 3b have the following configuration. That is, regarding the well-known telephone function, both of the phones 3a, 3b have the same configuration. Further, both of the cellular phones 3a, 3b have (a) control unit for controlling the operation of the subject cellular phone as a whole, (b) a telephone communication unit for controlling telephone communication with a communication network 18, (c) a BT interface unit for controlling BT communication, (d) a key input unit for receiving user input through an arrangement of various key pieces, (e) a storage unit for storing various data such as, for example, telephone book data that lists telephone number to registration name relations, (f) a screen unit for showing various screens, (g) a microphone for receiving an input of user's voice (i.e., a voice input unit of the cellular phone in claims), and (h) a speaker for outputting caller's voice (i.e., a voice output unit of the cellular phone in claims). In this case, the BT interface unit of the cellular phones 3a, 3b is capable of performing BT communication with the hands-free apparatus 2, is compliant to the HFP as the BT interface unit 5 of the hands-free apparatus 2 is, and is able to connect HFP with the hands-free apparatus 2.

When the cellular phone 3 (either of the two cellular phones 3a or 3b) and the hands-free apparatus 2 are connected by HFP between them, the cellular phone 3 may receive a voice call from the communication network 18. The following explanation describes that situation receiving a voice call from the network 18. The communication network 18 in this case includes well-known cellular phone communication service facilities such as a cellular phone base station, a base station controller and the like.

When the cellular phone 3 detects an incoming voice call from the communication network 18 while HFP is connected to the hands-free apparatus 2, the cellular phone 3 transmits an incoming voice call reception notice indicative of the reception of the incoming voice call to the hands-free apparatus 2. More practically, the incoming voice call reception notice transmitted from the cellular phone 3 to the hands-free apparatus 2 includes an ID of the cellular phone 3 such as a telephone number of the cellular phone 3 for example, in addition to a caller's telephone number if the caller's number has been received from the communication network 18. Further, the cellular phone 3 may also transmit a registered ring tone in the cellular phone to the hands-free apparatus 2, if the cellular phone 3 is a device being compliant to an inbound-ring tone.

When the control unit 4 of the hands-free apparatus 2 receives the incoming voice call reception notice through the BT the interface unit 5 from the cellular phone 3, the control unit 4 notifies the user of the reception of the incoming voice call to the cellular phone 3 by outputting a ring tone registered in the hands-free apparatus 2 from the speakers 12, 13. In this case, if the registered ring tone has been received from the cellular phone 3 (i.e., the ring tone registered in the cellular phone 3), that received tone is output from the speakers 12, 13 instead. Further, the control unit 4 displays, on the display screen 16, a call receiving screen indicative of the receiving of the voice call (details of the screen is mentioned later) for notifying the user of the reception of the incoming voice call by the cellular phone 3.

Thus, the user can recognize that the cellular phone 3 is receiving a voice call either by listening the ring tone from the speaker 12, 13 or by watching the call receiving screen on the display screen 16. Then, the user operates either of the hands-free apparatus 2 or the cellular phone 3 to determine how to respond to the voice call. That is, the user may operate the hands-free apparatus 2 either to pick up the voice call as a hands-free call or to reject the call, or the user may alternatively operate the cellular phone 3 either to pick up the voice call as a private call (i.e., a handset call in claims) or to reject the call. In this case, the hands-free call is a call that exchanges voice data between the cellular phone 3 and the hands-free apparatus 2 through a "voice path" to input and output the user/caller's voice from/to the microphone 10 and the speakers 12, 13 connected to the apparatus 2, and the handset call is a call that inputs and outputs voice from/to the microphone and the speaker on the cellular phone 3, with the "voice path" closed between the cellular phone 3 and the hands-free apparatus 2 for not exchanging the voice data.

Figure 2:
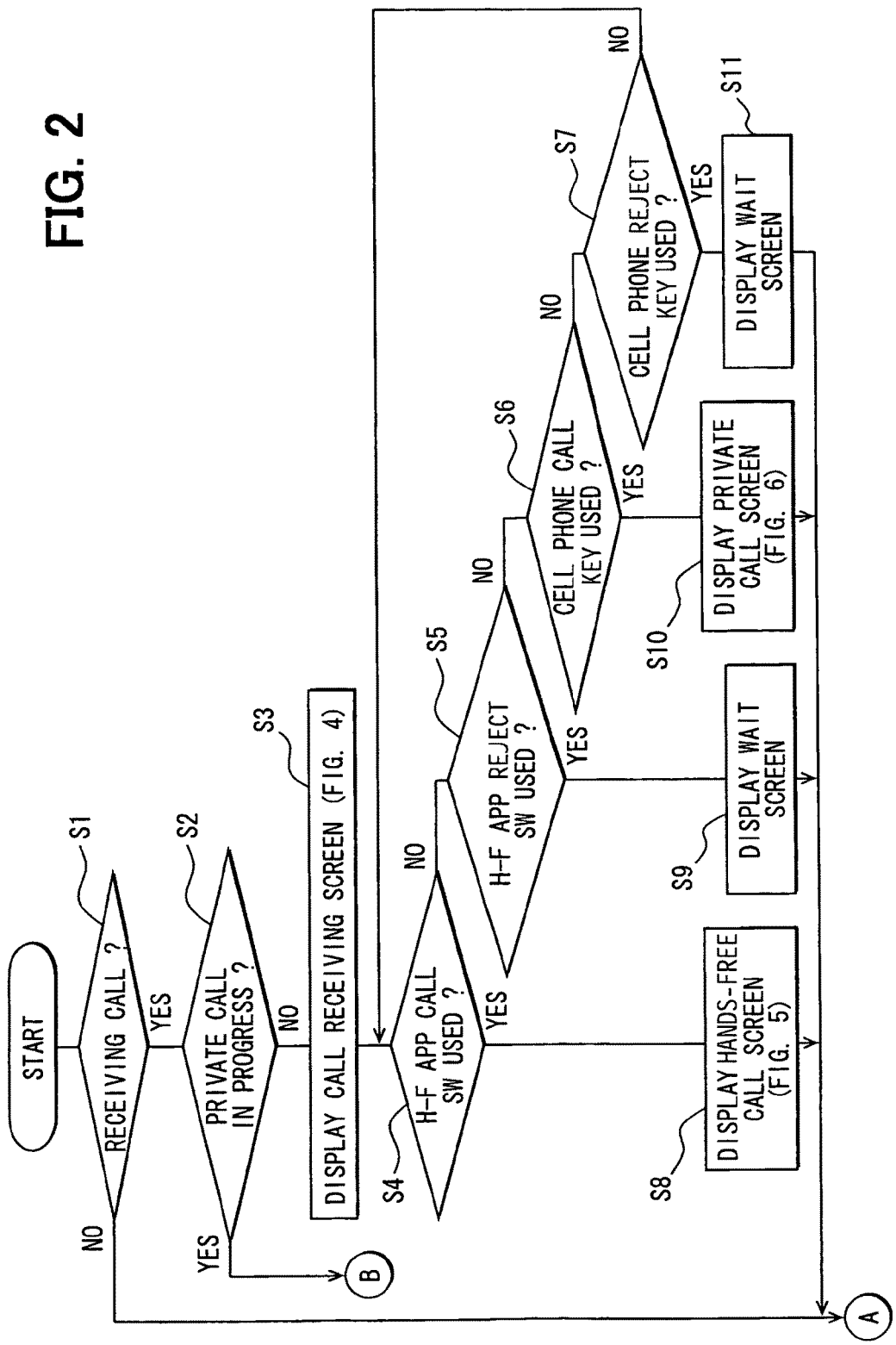
FIG. 2 is a first portion of a flowchart of a voice call reception detecting process in an embodiment of the present disclosure.
Figure 3:
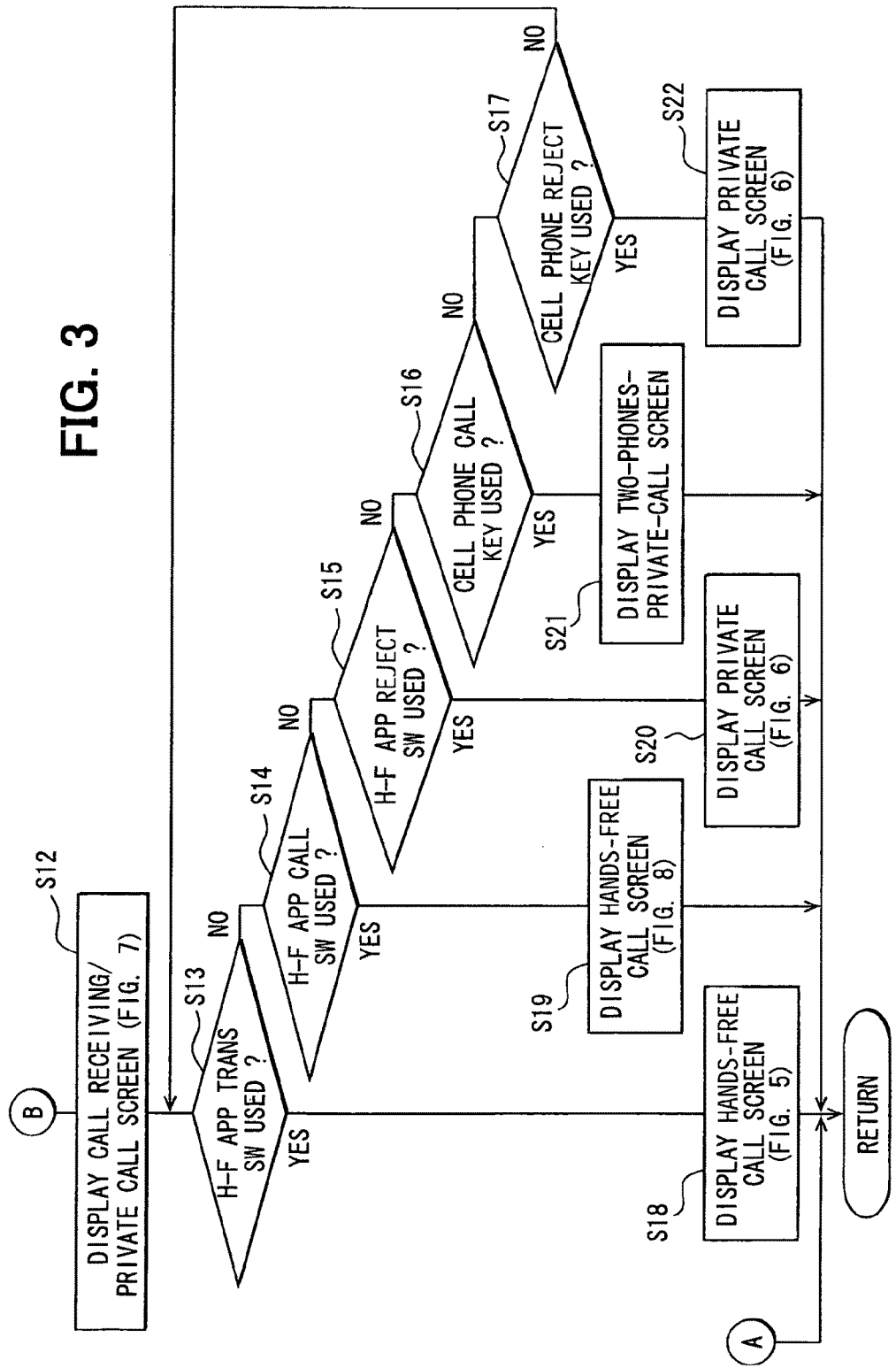
FIG. 3 is a second portion of a flowchart of the voice call reception detecting process in an embodiment of the present disclosure.

The operation of the above system is described in the following, with reference to FIGS. 2 to 8. FIGS. 2 and 3 show flowcharts of processes performed by the hands-free apparatus 2. In FIG. 2, a voice call reception detecting process is described by using a flowchart. This process is performed by the control unit 4 of the hands-free apparatus 2. In step S1, whether the voice call from the communication network 18 is being received by the cellular phone 3 is determined by the control unit 4. If the control unit 4 determines that the call is not being received by the cellular phone 3 (step S1: No), the process is finished for returning to other processes such as, for example, a main process.

When the control unit 4 determines that the call from the network 18 is being received by the cellular phone 3 (step S1: Yes), the control unit 4 determines, in step S2, whether there is another cellular phone 3 that is having a private call in progress at the moment of call reception by the cellular phone 3. If, the control unit 4 determines in step S2, there is no other cellular phone 3 having a call (step S2: No), the control unit 4 switches a waiting screen on the display screen 16 to a call receiving screen indicative of the reception of the voice call by the cellular phone 3.

Figure 4:
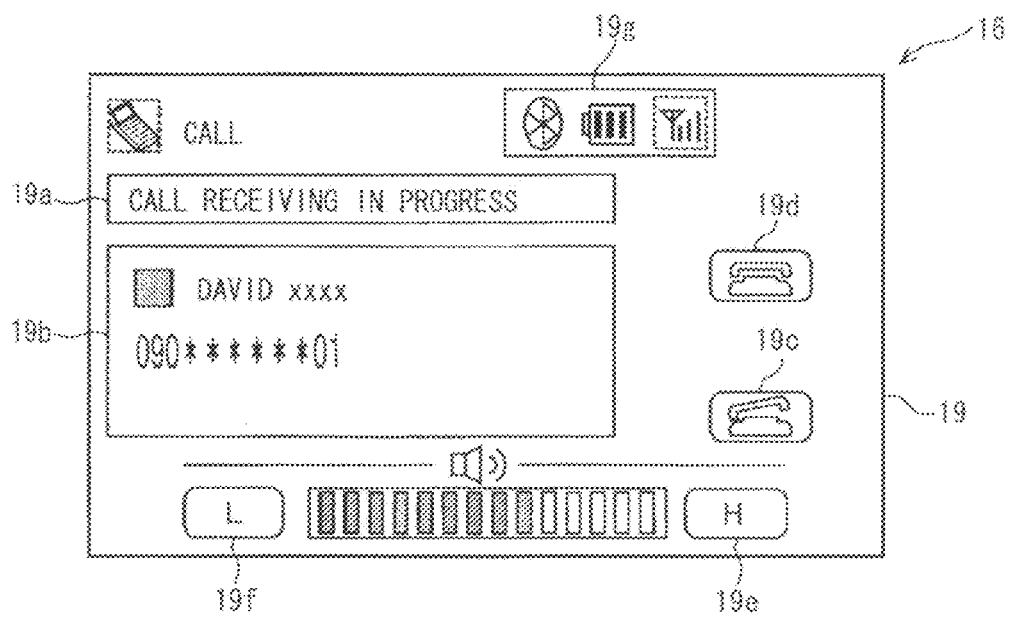
FIG. 4 is an illustration of a call receiving screen of a hands-free apparatus in an embodiment of the present disclosure.

More practically, when the voice call from a caller of "090******01" ('*' represents a digit of numerals) through the network 18 to the cellular phone 3b is received while both of the cellular phones 3a, 3b are in an HFP connected condition and the cellular phone 3a is in a waiting condition, the control unit 4 displays a call receiving screen 19 on the display screen 16 upon receiving the incoming voice call reception notice from the cellular phone 3b through the BT interface unit 5, as shown in FIG. 4. In FIG. 4, after receiving the caller number "090****01" from the cellular phone 3b, the received number is displayed on the display screen 16 together with the caller's name "DAVID **" that is stored in a phone book data in association with the corresponding caller number.

The control unit 4 displays, in a condition display area 19a of the call receiving screen 19, "CALL RECEIVING IN PROGRESS" for representing that the voice call is being received, and also displays the caller number "090****01" and the caller's name "DAVID **" in a caller information display area 19b. Further, the control unit 4 displays a call pick-up switch 19c for picking up a call, a call reject switch 19d for rejecting a call, a volume-up switch and a volume-down switch 19e, 19f for controlling sound volume from the speaker 12, 13 in the call receiving screen 19. Further, the control unit 4 displays a battery icon for displaying a battery residue amount received from the cellular phone 3b, and a signal intensity icon for displaying a radio signal reception condition in a cellular phone condition area 19g.

Therefore, the user can pick up the call as a hands-free call by operating the call pick-up switch 19c in the screen 19 when the cellular phone 3b is receiving the incoming voice call, or can reject the call by operating the call reject switch 19d in the screen 19, or can pick up the call as a private call by operating a pick-up key on the cellular phone 3b, or can reject the call by operating a reject key on the cellular phone 3b.

Figure 5:
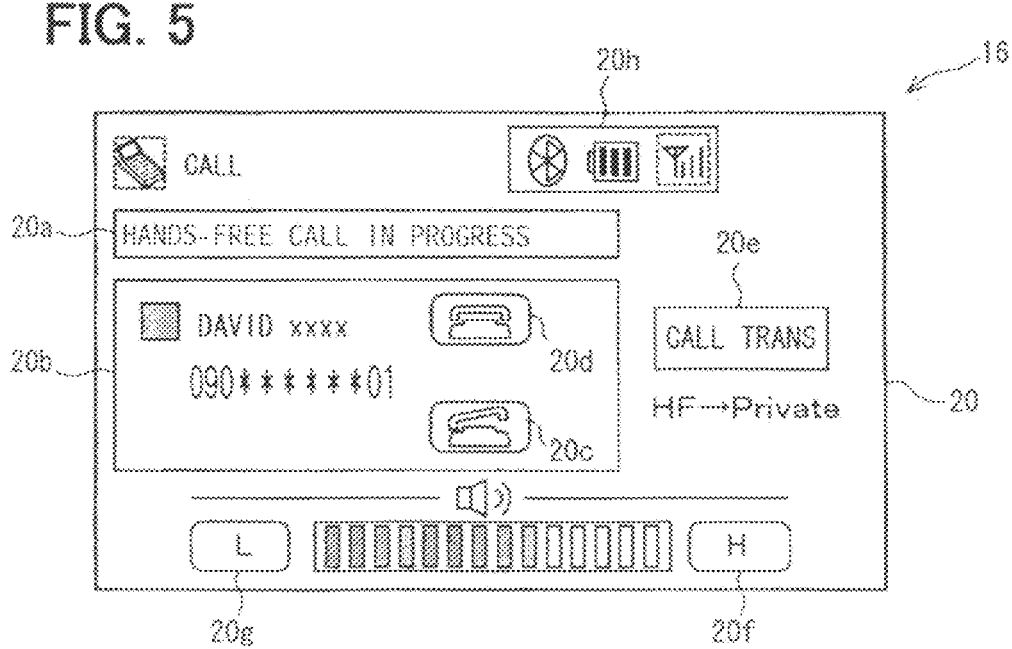
FIG. 5 is an illustration of a hands-free call screen of the hands-free apparatus in an embodiment of the present disclosure.

The control unit 4 determines whether the user has operated either of the call pick-up switch 19c or the call reject switch 19d after displaying the call receiving screen 19 on the display screen 16 (steps S4, S5), and determines whether the user has operated either of the call pick-up key or the call reject key on the cellular phone 3b upon having a condition input from the cellular phone 3b (steps S6, S7). The call pick-up switch 19c and call reject switch 19d on the hands-free apparatus 2 are abbreviated as H-F APP CALL SW and H-F APP REJECT SW in those steps of FIG. 2, and the call pick-up key and the call reject key on the cellular phone 3b are abbreviated as CELL PHONE CALL KEY and CELL PHONE REJECT KEY in those steps of FIG. 2. If, the control unit 4 determines, the call pick-up switch 19c in the screen 19 is operated by the user (step S4, Yes), the control unit 4 controls the cellular phone 3b to perform a response operation to pick up the incoming voice call, by establishing a voice path between the BT interface unit 5 and the cellular phone 3b, and switches the call receiving screen 19 to a hands-free call screen 20 on the display screen 16 as shown in FIG. 5 for indicating that the cellular phone 3b is in a hands-free call condition after the cellular phone 3b has transited from the voice call receiving condition to the hands-free call condition (step S8).

The control unit 4 displays "HANDS-FREE CALL IN PROGRESS" for representing that the hands-free call is being placed in a condition display area 20a of the hands-free call screen 20, and displays the caller number "090****01" and the caller's name "DAVID **" in a caller information display area 20b. Further, the control unit 4 displays a call hold switch 20c for allowing the user to put the call on hold, a call termination switch 20d for allowing the user to terminate the hands-free call, a call transfer switch 20e for allowing the user to switch (i.e., transfer) the hands-free call to the private call, a volume-up switch and a volume-down switch 20f, 20g for controlling sound volume from the speaker 12, 13 in the hands-free call screen 20. Further, the control unit 4 displays, just like the call receiving screen 19, the battery icon for displaying the battery residue amount received from the cellular phone 3b, and the signal intensity icon for displaying a radio signal reception condition in a cellular phone condition area 20h.

On the other hand, if, the control unit 4 determines, the call reject switch 19d in the screen 19 is operated by the user (step S5, Yes), the control unit 4 controls the cellular phone 3b to perform a call rejection operation to reject the incoming voice call, and switches the call receiving screen 19 on the display screen 16 in FIG. 4 to the waiting screen indicative of a call waiting condition after the cellular phone 3b has transited to the waiting condition (step S9).

Figure 6:
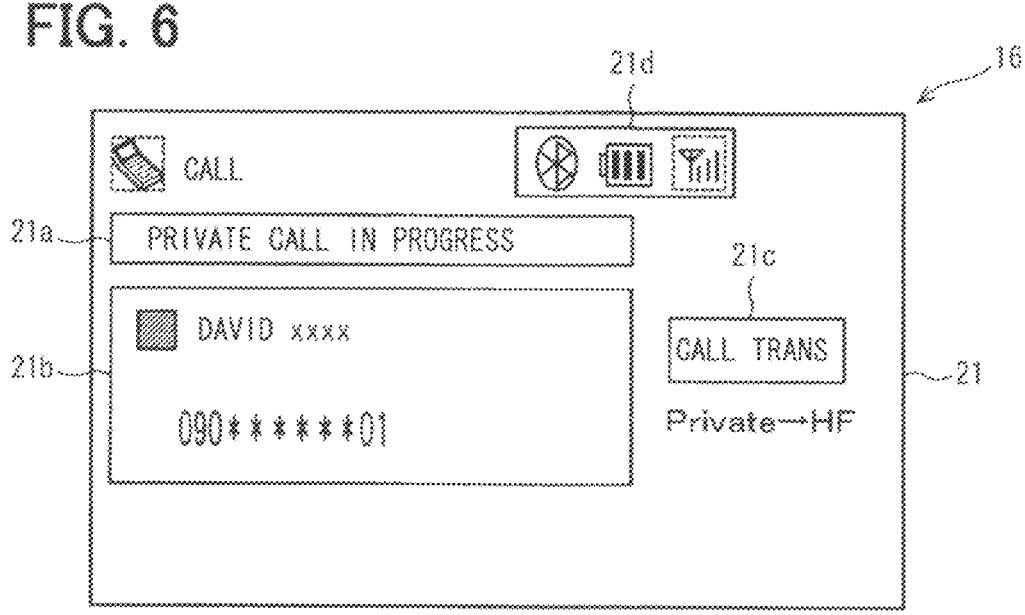
FIG. 6 is an illustration of a private call screen of the hands-free apparatus in an embodiment of the present disclosure.

Further, if, the control unit 4 determines, the user has operated the call pick-up key on the cellular phone 3b (step S6, Yes) upon having a condition input from the cellular phone 3b, the control unit 4 controls the cellular phone 3b to perform a response operation to pick up the incoming voice call, without establishing a voice path between the BT interface unit 5 and the cellular phone 3b, and switches the call receiving screen 19 to a private call screen 21 on the display screen 16 as shown in FIG. 6 for indicating that the cellular phone 3b is in a private call condition after the cellular phone 3b has transited from the call receiving condition of the incoming voice call to a private call condition (step S10).

The control unit 4 displays "PRIVATE CALL IN PROGRESS" for representing that the private call is being placed in a condition display area 21a of the private call screen 21, and displays the caller number "090****01" and the caller's name "DAVID **" in a caller information display area 21b. Further, the control unit 4 displays a call transfer switch 21c for allowing the user to switch (i.e., transfer) the private call to the hands-free call. Further, the control unit 4 displays, just like the call receiving screen 19, the battery icon for displaying the battery residue amount received from the cellular phone 3b, and the signal intensity icon for displaying a radio signal reception condition in a cellular phone condition area 21d.

On the other hand, if, the control unit 4 determines, the user has operated the call reject key on the cellular phone 3b (step S7, Yes) upon having a condition input from the cellular phone 3b, the control unit 4 controls the cellular phone 3b to perform a rejection operation to reject the incoming voice call, and switches the call receiving screen 19 on the display screen 16 in FIG. 4 to the waiting screen indicative of a call waiting condition after the cellular phone 3b has transited to the waiting condition (step S11).

If, in step S2, the control unit 4 determines, there is another cellular phone 3 having a different private call (step S2: Yes), at the moment of receiving an incoming voice call by one cellular phone 3 from the network 18, the control unit 4 switches the private call screen on the display screen 16 to the call receiving/private call in progress screen indicative of one of the cellular phones 3 receiving the incoming voice call while the other cellular phone 3 is having the private call (step S12).

Figure 7:
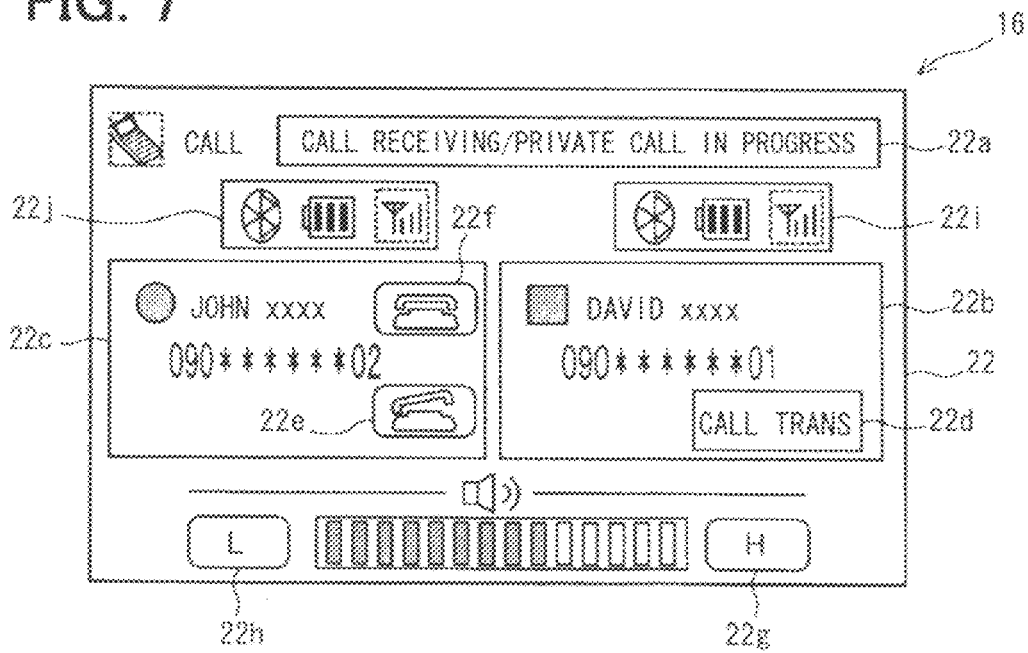
FIG. 7 is an illustration of a call receiving/private call screen of the hands-free apparatus in an embodiment of the present disclosure.

More practically, when the voice call from the caller of "090******02" ("*" represents a digit of numerals) through the network 18 to the cellular phone 3b is received while both of the cellular phones 3a, 3b are in an HFP connected condition and the cellular phone 3a is in a private call condition, the control unit 4 displays a call receiving/private call screen 22 on the display screen 16 upon receiving the incoming voice call reception notice from the cellular phone 3b through the BT interface unit 5, as shown in FIG. 7. In FIG. 7, after receiving the caller number "090****02" from the cellular phone 3b, the received number is displayed on the display screen 16 together with the caller's name "JOHN **" that is stored in a phone book data in association with the corresponding caller number.

The control unit 4 displays, in a condition display area 22a of the call receiving/private call screen 22, "CALL RECEIVING/PRIVATE CALL IN PROGRESS" for representing that the voice call is being received together with a private call in progress, and also displays the caller number "090****01" and the caller's name "DAVID " regarding the private call in a caller information display area 22b, and further displays the caller number "090**02" and the caller's name "JOHN **" regarding the incoming voice call in a caller information display area 22c. Further, the control unit 4 displays a call transfer switch 22d for allowing the user to switch (i.e., transfer) the private call to the hands-free call (i.e., a call transfer switch in claims), a call pick-up switch 22e for picking up the incoming voice call (i.e., a response switch in claims), a call reject switch 22f for rejecting the incoming voice call, a volume-up switch and a volume-down switch 20g, 20h for controlling sound volume from the speaker 12, 13 in the hands-free call screen 20. Furthermore, the control unit 4 displays the battery icon for displaying the battery residue amount received from the cellular phone 3a and the signal intensity icon for displaying a radio signal reception condition in a cellular phone condition area 22i, and displays the battery icon for displaying the battery residue amount received from the cellular phone 3b and the signal intensity icon for displaying a radio signal reception condition in a cellular phone condition area 22j.

Therefore, when the cellular phone 3a is having the private call and the cellular phone 3b is receiving the incoming voice call, the user can either (a) switch the private call of the cellular phone 3a to the hands-free call by operating the call transfer switch 22d in the call receiving/private call screen 22, or (b) pick up the incoming voice call of the cellular phone 3b as a hands-free call by operating the call pick-up switch 22e in the call receiving/private call screen 22, or (c) reject the incoming voice call to the cellular phone 3b by operating the call reject switch 22f in the call receiving/private call screen 22, or (d) pick up the private call of the cellular phone 3a as a private call by operating the call pick-up key on the cellular phone 3a, or (e) reject the private call to the cellular phone 3a by operating the call reject key on the cellular phone 3a. That is, in other words, the user can handle both of the private call condition of the cellular pone 3a and the call receiving condition of the cellular phone 3b by an operation in the call receiving/private call screen 22.

Then, the control unit 4 determines which of the call transfer switch 22d, the call pick-up switch 22e, or the call reject switch 22f is operated by the user after displaying the call receiving/private call screen 22 on the display screen 16 (steps S13 to S15), and determines which of the call pick-up key or the call reject key of the cellular phone 3b is operated by the user upon having a condition input from the cellular phone 3b (steps S16 and S17).

Then, if, the control unit 4 determines, the call transfer switch 22d in the screen 22 is operated by the user (step S13, Yes), the control unit 4 switches the call receiving/private call screen 22 to a hands-free call screen 23 on the display screen 16 as shown in FIG. 7 for indicating that the cellular phone 3a is in a private call condition, after a transition of the cellular phone 3a from the private call condition to the hands-free call condition by the establishment of a voice path between the BT interface unit 5 and the cellular phone 3a (step S18).

Figure 8:
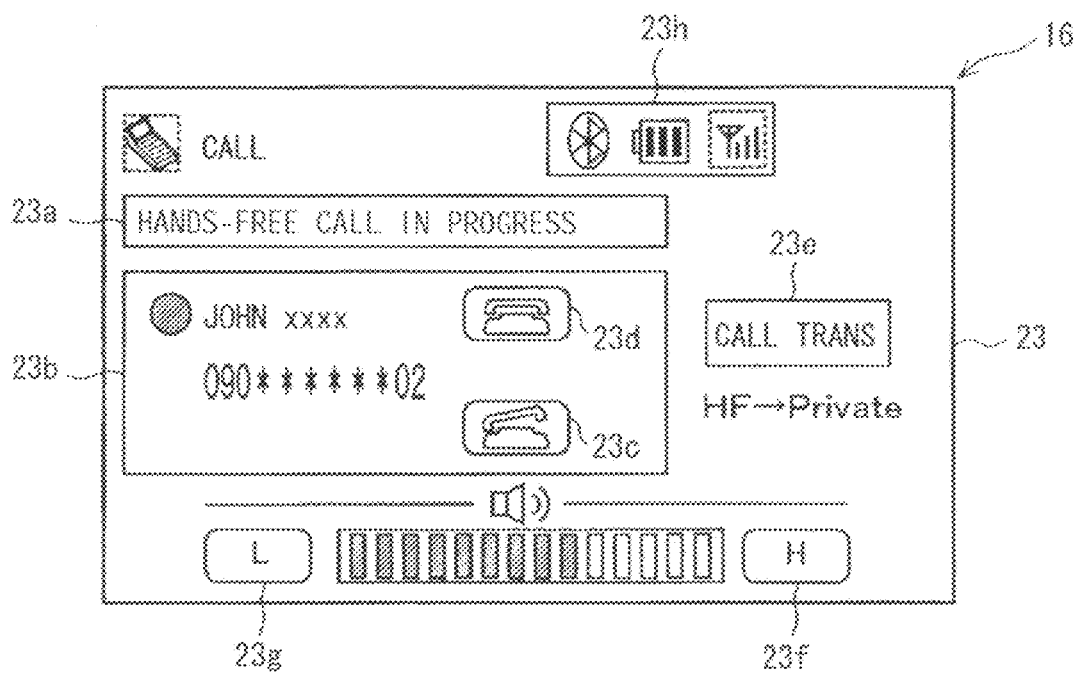
FIG. 8 is an illustration of a hands-free call screen of the hands-free apparatus in an embodiment of the present disclosure.

Alternatively, if, the control unit 4 determines, the call pick-up switch 22e in the screen 22 is operated by the user (step S14, Yes), the control unit 4 controls the cellular phone 3b to perform a response operation to pick up the incoming voice call, by establishing a voice path between the BT interface unit 5 and the cellular phone 3b, and switches the call receiving/private call screen 22 on the display screen 16 in FIG. 7 to the hands-free call screen 23 in FIG. 8 for indicating that the cellular phone 3b is in a hands-free call condition after the transition of the cellular phone 3b from the voice call receiving condition to the hands-free call condition (step S19). In FIG. 8, display areas 23a, 23b, 23h, and switches 23c to 23g in the hands-free call screen 23 respectively have the same function as the display areas 20a, 20b, 20h and the switches 20c to 20g in the hands-free call screen 20.

Alternatively, if, the control unit 4 determines, the call reject switch 22f in the screen 22 is operated by the user (step S15, Yes), the control unit 4 controls the cellular phone 3b to perform a call rejection operation to reject the incoming voice call, and switches the call receiving/private call screen 22 on the display screen 16 in FIG. 7 to the private call screen in FIG. 6 for representing that the cellular phone 3a is in the private call condition, (i.e., a screen immediately before the incoming voice call is received by the cellular phone 3b) after the transition of the cellular phone 3b to the waiting condition (step S20).

Alternatively, if, the control unit 4 determines, the user has operated the call pick-up key on the cellular phone 3b (step S16, Yes) upon having a condition input from the cellular phone 3b, the control unit 4 controls the cellular phone 3b to perform a response operation to pick up the incoming voice call, without establishing a voice path between the BT interface unit 5 and the cellular phone 3b, and switches the call receiving/private call screen 22 in FIG. 7 to a two phones private call screen on the display screen 16 for indicating that both of the two cellular phones 3a, 3b are in a private call condition after the transition of the cellular phone 3b from the call receiving condition of the incoming voice call to the private call condition (step S21).

Alternatively, if, the control unit 4 determines, the user has operated the call reject key on the cellular phone 3b (step S17, Yes) upon having a condition input from the cellular phone 3b, the control unit 4 controls the cellular phone 3b to perform a call rejection operation to reject the incoming voice call, and switches the call receiving/private call screen 22 in FIG. 7 to the private call screen 21 in FIG. 6 after the transition of the cellular phone 3b to the waiting condition (step S22).

In the present embodiment, according to the above description, in case the two cellular phones 3a, 3b are connected to the hands-free apparatus 2 by simultaneous HPF connections and the cellular phone 3a is in the private call condition, the hands-free apparatus 2 is configured to simultaneously display (a) the call transfer switch 22d for switching the cellular phone 3a from the private call condition to the hands-free call condition, (b) the call pick-up switch 22e for picking up the incoming voice call to the cellular phone 3b that is in the call receiving condition, and (c) the call reject switch 22f for rejecting the call to the cellular phone 3b, when the incoming voice call to the cellular phone 3b is placed.

In this manner, the user can select either of the three options, that is, (a) whether or not to establish a hands-free call by switching the private call of the cellular phone 3a to the hands-free call by operating the call transfer switch 22d, (b) whether or not to establish a hands-free call by picking up the incoming voice call to the cellular phone 3b by operating the call pick-up switch 22e, or (c) whether or not to reject the incoming voice call to the cellular phone 3b by operating the call reject switch 22f. Therefore, no operation restriction is imposed on both of the cellular phone 3a having the private call and the cellular phone 3b being in the call receiving condition.

Although the present disclosure has been fully described in connection with preferred embodiment thereof with reference to the accompanying drawings, it is to be noted that various changes and modifications will become apparent to those skilled in the art.

For example, the function of the in-vehicle hands-free apparatus may be incorporated in another in-vehicle apparatus such as an in-vehicle navigation apparatus or the like.

The number of the cellular phones connected to the hands-free apparatus by the simultaneous HFP connections may be more than three. In that case, the call transfer switches for two or more cellular phones in the private call condition and the call pick-up/reject switches for one cellular phone may be simultaneously displayed on the screen for the user, for the purpose of handling a situation that the two or more cellular phones are having the private call with the one cellular phone receiving the incoming voice call.

The call transfer switch (i.e., a call transfer switch in claims) operable for switching the private call to the hands-free call, the call pick-up switch (i.e., a response switch in claims) operable for picking up the incoming voice call, the call reject switch operable for rejecting the incoming voice call may not be limited to the touch switches on the display screen, but may be formed as mechanical switches in the proximity of a steering wheel, or at a center console as well as other easily-operable positions. In that case, the operation procedure of those switches may be displayed on the display screen.

Such changes, modifications, and summarized schemes are to be understood as being within the scope of the present disclosure as defined by appended claims.

What is claimed is:

1. A hands-free apparatus for use in a vehicle comprising:
a connection unit simultaneously establishing a connection to each of multiple cellular phones through a hands-free call protocol being connected for a hands-free call, each of the cellular phones is capable of selecting one of two call conditions, (a) one of the two call conditions is a hands-free call condition that enables, with a voice path connected to the hands-free apparatus, voice input by a voice input unit of the hands-free apparatus and voice output by a voice output unit of the hands-free apparatus for sending and receiving voice between the hands-free apparatus and a call partner, and (b) the other of the two call conditions is a handset call condition that enables, with the voice path closed to the hands-free apparatus, voice input by a voice input unit of the cellular phone and voice output by a voice output unit of the cellular phone for sending and receiving voice between the cellular phone and the call partner;

a control unit presenting two functions, among which a first function is to make a user accessible to a call transfer switch that, in response to a user operation, allows switching to the hands-free call condition from the handset call condition of the cellular phone through the currently-connected hands-free call protocol being connected to the connection unit, and a second function is to make the user accessible to a response switch that, in response to a user operation, establishes a hands-free call for responding to an incoming voice call to the cellular phone that has the hands-free call protocol currently being connected to the connection unit, wherein, when it is determined that (i) one of the multiple cellular phones currently having the hands-free call protocol connected to the connection unit is in the handset call condition and not the hands-free call condition, and (ii) an other one of the multiple cellular phones currently having the hands-free call protocol connected to the connection unit is receiving an incoming voice call, the control unit makes the user simultaneously accessible to the call transfer switch in association with the one of the multiple cellular phones and accessible to the response switch in association with the other one of the multiple cellular phones.

2. The hands-free apparatus of claim 1, wherein
the control unit has a third function that, in response to a user operation, makes the user accessible to a call reject switch that rejects an incoming voice call to the cellular phone that is currently connected through the hands-free call protocol to the connection unit, and, when it is determined that (a) the one of the multiple cellular phones currently having the hands-free call protocol connected to the connection unit is in the handset call condition and (b) the other one of the multiple cellular phones currently having the hands-free call protocol connected to the connection unit is receiving an incoming voice call, the control unit makes the user simultaneously accessible to the call transfer switch in association with the one of the multiple cellular phones and accessible to both of the response switch and the call reject switch in association with the other one of the multiple cellular phones.

3. The hands-free apparatus of claim 1, further comprising:
transferring the handset call condition of the one of the multiple cellular phones to the hands-free call condition only when the call transfer switch is activated by the user; and
enabling the hands-free call condition with the other one of the multiple cellular phones only when the response switch is activated by the user.

4. An in-vehicle hands-free apparatus disposed in a vehicle, the in-vehicle hands-free apparatus comprising:
a display unit configured to display an operation to a user;
a voice control unit configured to receive and transmit sound waves via a voice path;
a connection unit configured to establish simultaneous a connection to each of multiple cellular phones through a hands-free call protocol being connected for a hands-free call, each of the cellular phones is capable of selecting a hands-free call condition or a handset call condition, the hands-free call condition enables voice exchange via the voice path of the voice control unit, and in the handset call condition the voice path of the voice control unit is closed and the voice exchange is enabled with a receiver and a transmitter of the cellular phone, and;
a control unit configured to present two operations on the display unit to the user, a first operation is presented as a call transfer switch that, in response to a user operation, switches to the hands-free call condition from the handset call condition of the cellular phone through the currently-connected hands-free call protocol being connected to the connection unit, and the second operation is presented as a response switch that, in response to a user operation, establishes a hands-free call for responding to an incoming voice call to the cellular phone that has the hands-free call protocol currently being connected to the connection unit, wherein, when it is determined that (i) one of the multiple cellular phones currently having the hands-free call protocol connected to the connected unit is in the handset call condition and not the hands-free call condition, and (ii) another one of the multiple cellular phones currently having the hands-free call protocol connected to the connection unit is receiving an incoming voice call, the control unit simultaneously presents to the user the call transfer switch in association with the cellular phone in the handset call condition, and presents the response switch in association with the other cellular phone that is receiving an incoming call.

5. The in-vehicle hands-free apparatus of claim 4, wherein
the control unit has a third operation that, in response to a user operation, makes the user accessible to a call reject switch that rejects an incoming voice call to the cellular phone that is currently connected through the hands-free call protocol to the connection unit, and, when it is determined that (a) the cellular phone in the handset call condition and has the hands-free call protocol currently connected to the connection unit and (b) the other cellular phone is receiving an incoming voice call and has the hands-free call protocol currently connected to the connection unit, the control unit simultaneously presents to the user the call transfer switch in association with the cellular phone in the handset call condition, and the response switch and the call reject switch in association with the other cellular phone that is receiving an incoming call.

6. The hands-free apparatus of claim 4, further comprising:
transferring the handset call condition of the one of the multiple cellular phones to the hands-free call condition only when the call transfer switch is activated by the user; and
enabling the hands-free call condition with the other one of the multiple cellular phones only when the response switch is activated by the user.

* * * * *